United States Patent Office 3,755,419
Patented Aug. 28, 1973

3,755,419
PROCESS FOR PREPARING ETHYLENE 1,2-DICAR-
BOXYLIC ACID AND DERIVATIVE THEREOF
Chiyuki Fujii, Yamato, Michimasa Hirata, Tokyo, and
Takeo Shinada, Ebina-Machi, Japan, assignors to Denki
Kagaku Kogyo Kabushiki Kaisha, Tokyo, Japan
No Drawing. Filed Dec. 10, 1971, Ser. No. 206,921
Claims priority, application Japan, Dec. 24, 1970,
45/117,293, 45/117,295
Int. Cl. C07c 69/60
U.S. Cl. 260—485 R          4 Claims

ABSTRACT OF THE DISCLOSURE

Ethylene 1,2-dicarboxylic acid or derivatives thereof, is prepared by reacting acetylene with carbon monoxide in the presence of a palladium compound and an amino acid.

BACKGROUND OF THE INVENTION

Field of the invention

This invention relates to a process for preparing ethylene 1,2-dicarboxylic acid and/or a derivative thereof by the carbonylation of acetylene with carbon monoxide.

Description of prior art

Ethylene 1,2-dicarboxylic acids, particularly maleic acid, has been prepared conventionally by the oxidation of benzene, butadiene or butylene. It has also been disclosed that maleic esters can be produced by reacting acetylene and carbon monoxide in the presence of palladium halide at high temperatures and under high pressures. Heretofore, however, no reaction has been suggested using acetylene and carbon monoxide under mild reaction conditions. Considering the relative cheapness of acetylene and carbon monoxide, such a reaction would be quite industrially attractive, and hence a need exists for a technique of producing ethylene 1,2-dicarboxylic acids or derivatives thereof under mild reaction conditions.

Acetylene-carbon monoxide reactions have been disclosed in other contexts for producing other products. For instance, it is known to react these materials in the presence of nickel carbonyl, to produce acrylic acid.

SUMMARY OF THE INVENTION

Accordingly, it is one object of this invention to provide a process for preparing ethylene 1,2-dicarboxylic acid or a derivative thereof by reacting acetylene with carbon monoxide.

It is another object of this invention to provide a process for preparing a large quantity of ethylene 1,2-dicarboxylic acid, such as maleic acid or fumaric acid or derivatives thereof, by the reaction of acetyelne and carbon monoxide under relatively mild reaction conditions.

These and other objects as will hereinafter become more readily apparent can be attained by reacting acetylene with carbon monoxide in the presence of a palladium compound and an amino acid, in a solvent.

Preferably, the subject reaction is carried out in the presence of a palladium compound having a strong acid residual group, an amino acid and a heavy metal salt while supplying oxygen to increase the reaction rate and to prolong the catalyst life.

DETAILED DESCRIPTION OF THE INVENTION

The palladium compounds used in the process of this invention are preferably the palladium salts and especially the strong acid salts of palladium having a strong acid residual group. Typical of such palladium compounds, are palladium chloride, palladium bromide, palladium iodide, palladium sulfonates, palladium oxyhalides, such as palladium chlorate, palladium halogenoacetates, palladium nitrate, palladium sulfate, or the like.

It is also possible to use a combination of a palladium compound and a strong acid to prepare strong acid salts of palladium in the reaction system; for instance, palladium acetate combined with hydrogen chloride, palladium oxide combined with nitric acid, or the like.

Suitable amino acids used in this process include the aliphatic amino acids, e.g., glycine, alanine valine, the oxyamino acids, e.g., serine, threonine, tyrosine; the aromatic amino acids, e.g., phenylalanine, tyrosine; the acidic amino acids, e.g., glutamic acid; the basic amino acids, e.g., lysine and derivatives thereof. However, sulphur-containing amino acids such as methionine, cysteine, cystine, etc. are not as effective as the others for the process of this invention.

It is believed that these amino acids react with the palladium compounds to form complexes which are catalytic toward the reaction of acetylene and carbon monoxide and are effective for providing a high degree of selectivity toward the resulting products. Accordingly, as one embodiment of this invention, it is possible to charge to the reaction system, a complex of palladium and amino acid, which has previously been prepared outside of the reaction system.

Regardless of whether the complex is formed in situ or outside the reaction system, it is desirable to add a heavy metal salt to activate the palladium compound and the amino acid catalysts. The heavy metal salt used functions as an oxidizing agent to recover the high catalytic activity of the palladium compound whereby the palladium formed by the reduction of the palladium compound in the carbonyl reaction is oxidized and thereby reactivated.

Suitable heavy metal salts include the salts of iron and nickel. Most preferred are those heavy metal salts which are soluble in the reaction system. Suitable anionic groups for those heavy metal salts may be any of those which are specified above as being useful in the palladium compounds.

It is preferable to use the palladium compound in an amount of from 0.00001%–10% by weight, calculated as Pd, based on the total reactants. The amino acid may suitably be used in at least equimole amounts and preferably 2–10 times the equimolar amount based on the moles of palladium compound. The heavy metal salts may be used in amount of from 1–100 times the equimolar amount and preferably from 2–20 times the equimolar amount based on the moles of palladium compound.

The process of this invention can be used to provide the desired ethylene 1,2-dicarboxylic acid or the ester or halide thereof by use of the appropriate solvent.

If an alcohol is used as the solvent, the corresponding ester is produced. If water is used, the acid is produced, and if halogen in an inert solvent is used, the corresponding acid halide is produced.

When maleic acid or derivative thereof is being produced, a small amount of the corresponding fumaric acid or derivative will usually be obtained.

Suitable alcohols used for this purpose can be any alcohol which will form the corresponding ester. Typical of such alcohols include the aliphatic alcohols, e.g., methanol, ethanol, n-propanol, i-propanol, n-butanol, i-butanol, secondary butanol and glycol, which may be used in greater than stoichiometric amounts.

Suitable solvents for preparing the acid chloride are the aromatic hydrocarbons, e.g., benzene; the aliphatic hydrocarbons, e.g., n-heptane; the alicyclic hydrocarbons, e.g., cyclohexane; the halogenated hydrocarbons, e.g., carbon tetrachloride; the aliphatic ethers, e.g., ethyl-ether; the ketones, e.g., acetone; the nitriles, e.g., acetonitrile; the esters, e.g., ethyl acetate; dimethyl sulfoxide, etc. Mixtures of any of these solvents may also be used.

One of the characteristic advantages of this invention is that it is possible to effect the reaction under relative mild reaction conditions, such as room temperature and atmospheric pressure. It is also possible, however, to effect a reaction under high pressures, such as from 0–20 kg./cm.$^2$ G, and at high temperatures. The carbonyl reaction may be conducted at temperatures of from 0–100° C. However, it is possible to recover the palladium catalyst at temperatures of fom 20–200° C. The reaction temperature should be kept lower than the decomposition temperature of the amino acid. The ratio of acetylene, carbon monoxide, and oxygen is not critical. However, it is preferable that the molar ratio of carbon monoxide to acetylene be 1–10:1.

The oxygen should preferably be used in amounts of less than that of acetylene, and less than that amount which might cause accidental explosion. The reactant gas may be diluted with an inert gas, such as nitrogen, argon, carbon dioxide, methane or helium.

Having generally described the invention, a further understanding can be attained by reference to certain specific examples which are provided herein for purposes of illustration only and are not intended to be limiting in any manner unless otherwise specified.

EXAMPLE 1

Into a five neck flask, 1.30 g. of palladium nitrate and 1.96 g. of glycine were dissolved in 200 ml. of methanol and the mixture was kept at 45° C. while stirring. Carbon monoxide and acetylene were respectively fed at a velocity of 3 l./hr. of each gas, at room temperature into the solution and were reacted for 3 hours.

The resulting reaction solution was filtered to remove the solid components and then was admixed with 600 ml. of water and then was extracted with 60 ml. of ethyl ether 3 times. The ether layer was concentrated to obtain 0.19 g. of the resulting product.

In gas chromatography analysis, one peak was found at more than about 90% and one peak at about 5%. According to elementary analysis, infrared spectrum analysis and nuclear magnetic resonance analysis of the former component separated by a separation column, that product was confirmed as being dimethyl maleate. The latter component was also confirmed to be dimethyl fumarate.

EXAMPLE 2

Into a five neck flask, the amino acid stated in Table I was added to a system made of 1.00 g. of palladium chloride and 200 ml. of ethanol, and then carbon monoxide and acetylene were respectively fed at about 20° C. at the velocity of 3 l./hr. of each gas.

As a result, diethyl maleate and a small amount of diethyl fumarate were formed as shown in Table I.

TABLE I

| Amount of amino acid: | Diethyl maleate, g. |
|---|---|
| Glycine (1.98 g.) | 0.20 |
| DL-threonine (3.14 g.) | 0.17 |
| L-glutamic acid (3.88 g.) | 0.14 |
| DL-lysine hydrochloride (4.80 g.) | 0.16 |

EXAMPLE 3

Into a five neck flask, the amino acid stated in Table II was added to a system made of 1.00 g. of palladium chloride, 9.27 g. of ferric chloride and 200 ml. of methanol. Carbon monoxide and acetylene were respectively fed at a velocity of 3 l./hr. of each gas and oxygen was fed at a velocity of 0.3 l./hr., and then were reacted at about 20° C. for 6 hours.

The results are shown in Table II.

TABLE II

| Amount of amino acid (g.) | Diethyl maleate (g.) | Diethyl fumarate (g.) |
|---|---|---|
| Glycine (1.98) | 2.82 | 0.86 |
| N-methyl glycine (2.35) | 4.60 | 1.48 |
| L-α-alanine (2.35) | 4.66 | 1.54 |
| DL-valine (3.08) | 4.21 | 1.32 |
| DL-β-phenyl, α-alanine (4.35) | 3.98 | 1.04 |
| DL-serine (2.80) | 3.56 | 0.97 |
| L-cystein (3.19) | <0.05 | |
| DL-methionine (3.93) | <0.05 | |

EXAMPLE 4

Into a five neck flask, 1.34 g. of palladium sulfate, 4.73 g. of tyrosine, 14.72 g. of nickel sulfate and 200 ml. of ethanol, were mixed. Carbon monoxide and acetylene were fed at 25° C. at a velocity of 3 l./hr. of each gas and oxygen was fed at a velocity of 0.3 l./hr., and they were reacted for 3 hours.

As the result, 1.38 g. of diethyl maleate and 0.57 g. of diethtyl fumarate were obtained.

EXAMPLE 5

Into a five neck flask, 1.30 g. of palladium nitrate, 2.30 g. of β-alanine, 9.17 g. of ferric chloride and 200 ml. of water were mixed and acetylene and carbon monoxide were reacted, in accordance with the process of Example 4. The reaction product was admixed with sodium hydroxide to obtain an alkaline solution.

After filtering the precipitate, the filtrate solution was acidified with hydrogen chloride solution, and then water was evaporated to crystallize the product.

In thin layer chromatography analysis, a large spot corresponding to maleic acid and a small spot corresponding to fumaric acid were found. The solid product was purified by sublimation under 0.01 mm./Hg of reduced pressure, and 0.53 g. of the sublimate was obtained. By elementary analysis, infrared spectrum analysis, nuclear magnetic resonance analysis and alkali titration analysis, the product was confirmed to be maleic anhydride. According to gas chromatography analysis of the reaction solution, the formation of a small amount of acetoaldehyde as byproduct was formed.

EXAMPLE 6

Into a five neck flask, 1.50 g. of palladium bromide, 1.43 g. of threonine, 12.33 g. of nickel bromide and 200 ml. of acetone were mixed, and acetylene and carbon monoxide were reacted, in accordance with the process of Example 4.

By gas chromatography analysis of the reaction product, the peaks corresponding to maleic dibromide and fumaric dibromide were obtained. Methanol was added to the reaction product and the mixture was refluxed and analyzed for methyl ester. 0.58 g. of dimethyl maleate and 0.27 g. of dimethyl fumarate were found.

EXAMPLE 7

Into a five neck flask, 1.26 g. of palladium acetate, 5.02 g. of ferric chloride, 4.35 g. of phenylalanine and 200 ml. of ethyl ether containing 10% of hydrogen chloride, were mixed and then 3 l./hr. of carbon monoxide, 3 l./hr. of acetylene and 0.3 l./h. of oxygen were fed at 20° C. which were reacted for 3 hours.

Maleic dichloride and fumaric dichloride were obtained.

Methanol was added to to the reaction product and the reaction mixture was refluxed, and analyzed for methyl ester. 3.48 g. of dimethyl maleate and 1.24 g. of dimethyl fumarate were obtained.

EXAMPLE 8

1.00 g. of palladium chloride and 2.35 g. of β-alanine were dissolved in 200 ml. of methanol, and the solution was stirred at 40° C. for 48 hours and then was filtered to obtain 1.5 g. of a yellowish-orange color crystal of complex of β-alanine/palladium chloride, 1.52 g. of the reaction product, 75.0 g. of ferric chloride were dissolved in 200 ml. of methanol, and was fed to a 500 ml. autoclave made of stainless steel. A mixture gas of carbon monoxide and acetylene was fed to the autoclave at a rate of 8:1 of carbon monoxide to acetylene. Pressure of the feed was 6 kg./cm.$^2$. The reaction was effected at 40° C. for 30 minutes. After removing the gas, 10 kg./cm.$^2$ of air was fed and the mixture was reacted at 90° C. for 30 minutes. The operations were repeated four times. 4.20 g. of dimethyl maleate or 1.05 g. of dimethyl fumarate were obtained.

EXAMPLE 9

Into a five neck flask, 1.00 g. of palladium chloride and 1.98 g. of glycine were dissolved in 200 ml. of benzene and then 3 l./hr. of carbon monoxide, 3 l./hr. of acetylene were fed at 25° C. and were reacted over 3 hours.

By gas chromatography analysis, maleic dichloride and fumaric dichloride were found. Methanol was added to the reaction product, the reaction mixture was refluxed, and then analyzed for methyl ester.

A small amount of dimethyl fumarate and 0.15 g. of dimethyl maleate were found.

Having now fully described the invention, it will be apparent to one of ordinary skill in the art that many changes and modifications can be made thereto without departing from the spirit or scope of the invention.

Accordingly, what is claimed as new and desired to be secured by Letters Patent is:

1. A process for preparing ethylene-1,2-dicarboxylic compound selected from the group consisting of the corresponding acid, ester and acid halide which comprises reacting acetylene with carbon monoxide wherein the molar ratio of carbon monoxide to acetylene is 1–10:1, in the presence of a catalytic amount of a halide, halogeno acetate, sulfate, sulfonate, nitrate, chlorosulfonate, or oxyhalide of palladium, and an amino acid selected from the group consisting of glycine, alanine, valine, serine, threonine, tyrosine, phenylalanine, glutamic acid and lysine in a solvent selected from the group consisting of (a) an alcohol when said compound produced is the ester; (b) water, when said compound produced is the acid; and (c) halogen in an inert solvent, when said compound produced is the acid halide, wherein the palladium compound is present in an amount of 0.00001–10 mole percent calculated as Pd, based on the weight of acetylene, and the amino acid is present in at least equimolar amounts based on the moles of palladium compound, and the reaction is conducted at a temperature of lower than the decomposition temperature of the amino acid.

2. The process of claim 1, wherein the palladium compound is reacted with the amino acid to provide an amino acid complex and is used in said reaction in the complex form.

3. The process of claim 1, wherein an iron or nickel salt is added to the solvent and oxygen is fed to the reaction mixture together with acetylene and carbon monoxide.

4. The process of claim 1, wherein the solvent is selected from the group consisting of aliphatic hydrocarbons, aromatic hydrocarbons, alicyclic hydrocarbons, halogenohydrocarbons, ethers, esters, nitriles, ketones and dimethyl sulfoxide.

References Cited
UNITED STATES PATENTS
3,625,995   12/1971   Brattesani   260—485 R LORRAINE A. WEINBERGER, Primary Examiner E. J. SKELLY, Assistant Examiner U.S. Cl. X.R.

260—485 G, 533 A, 544 A